Jan. 30, 1962 R. D. ENGEL 3,019,327
FUSION CLADDING
Filed March 22, 1960
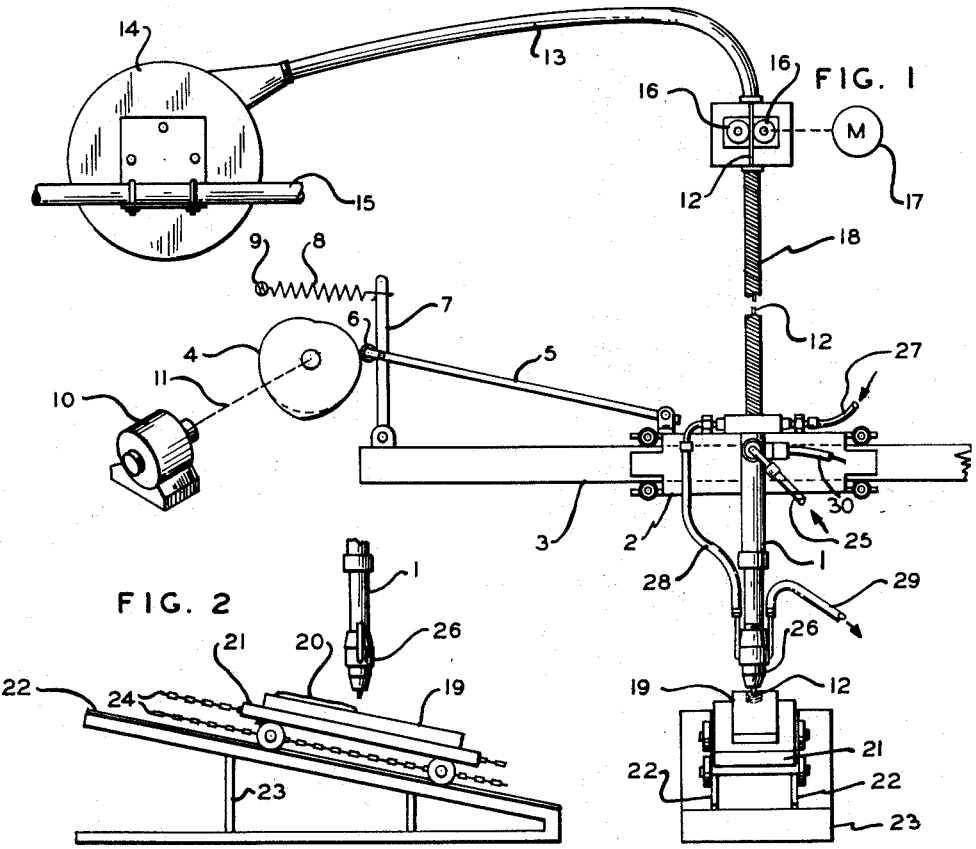
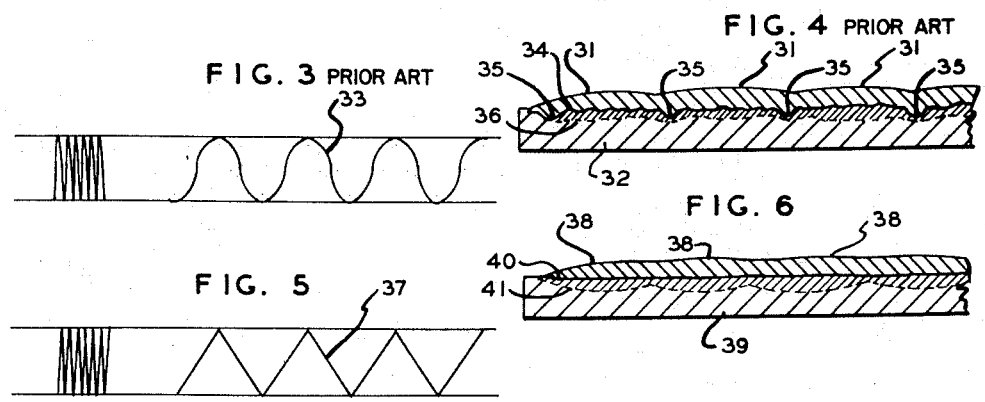
INVENTOR.
RALPH D. ENGEL
BY
ATTORNEY

United States Patent Office 3,019,327
Patented Jan. 30, 1962

3,019,327
FUSION CLADDING
Ralph D. Engel, Cranford, N.J., assignor to Air Reduction Company, Incorporated, New York, N.Y., a corporation of New York
Filed Mar. 22, 1960, Ser. No. 16,731
8 Claims. (Cl. 219—76)

This invention relates to the formation of an overlay of a clad metal on a base metal by arc welding with a fusible electrode which is oscillated laterally of its travel along the base metal to form a wide bead deposit. It is of particular utility when welding under conditions productive of an axial spray deposit of weld metal from a consumable electrode to the base metal.

The clad metal may be used for its corrosion and high temperature resisting properties or it may be used for its wear resisting properties. In nuclear power plants carbon and alloy steels coated with stainless steel, nickel, nickel alloys or like materials are being employed in fabricating reactor shells, steam generators and other high temperature pressure vessels. In most cases the physical size and shape of these fabricated forms make the use of mill clad steel plate impractical from the standpoint of cost and forming practices. Fusion cladding overcomes these disadvantages by coating the steel shells after forming and fabricating operations have been completed. This procedure avoids the highly stressed interface between the clad metal and the base metal that occurs during the formation of heavy mill clad sections. The high quality bond obtained by the fusion cladding process is difficult to obtain with the forming and stress relieving operations necessary to successfully form heavy mill clad sections. Other general fields of application for the fusion cladding process are resurfacing of large sugar cane rolls, shaft build up and repair, large valve and flange surfacing, and surfacing of large process tanks.

As stated above the fusion cladding process of the invention is preferably performed by arc welding under conditions productive of an axial spray deposit of weld metal from a consumable electrode to the base metal in a shielding gaseous atmosphere, although as will become apparent the invention is not so limited in its application.

An axial spray transfer of weld metal is obtained in high current density metal arc welding in an inert gas atmosphere under conditions described and claimed in United States Letters Patent No. 2,504,868 to Albert Muller, Glenn J. Gibson and Nelson E. Anderson, granted April 18, 1950. In accordance with the disclosure in this patent a bare electrode is used with reverse polarity direct current. Axial spray transfer of weld metal may also be achieved when welding with straight polarity direct current and with alternating current when the electrodes are suitably treated with specified activating agents as disclosed and claimed in United States Letters Patents Nos. 2,694,763 and 2,694,764, both to Albert Muller and both granted November 16, 1954. An axial spray deposit of weld metal is also obtainable in a carbon dioxide atmosphere under conditions described and claimed in United States Letters Patent No. 2,932,722 to Alexander Lesnewich and Everett H. Cushman and United States Letters Patent No. 2,932,723 to Craig R. Sibley and Alexander Lesnewich, both granted April 12, 1960. In each case the axial spray transfer of weld metal is substantially spatter free, develops deep weld penetration and is associated with an arc having selfregulating characteristics.

Axial spray transfer of weld metal occurs in high current density arc welding when the welding current is above some minimum value commonly referred to as the transition current at which the molten drops of metal released from the consumable metal electrode suddenly increase in number with the concurrent reduction in their size and are forcefully projected axially from the end of the electrode to produce this axial spray. Spray arcs are more stable than arcs operating at current values below the transition current where the globular transfer of weld metal is largely misdirected, produces short circuits in the arc, and results in much spatter of weld metal. The quiet operating characteristics of a spray arc make it possible to readily protect the welding operation with a flowing stream of shielding gas. Also by using a shielding gas the welding operation is fully visible at all times and there is no residue of flux to clean from the welded part or to become embedded in the weld or in the interface between the weld and the base metal.

A stringer bead technique has been employed for fusion cladding by arc welding in a shielding gas under conditions producing an axial spray transfer of weld metal from the electrode to the base metal. This technique involves overlapping stringer beads to form a continuous layer of weld metal. The principal objection to this method is the characteristic deep papillary depression of the fusion line of each weld bead and the resulting dilution of the clad metal by the base metal. When subjected to side bend tests, samples of the clad metal invariably fail in the immediate area of a papillary depression.

Side bend tests are employed in qualifying welds in accordance with desired specifications of quality and are made in accordance with a standardized test procedure. Sections are cut from a test specimen and examined for defects after polishing and etching the cut surfaces. The sections are then bent through 180° to bring the cut surfaces opposite one another and to stress at the bend the weld between the clad and base metals. After bending the sections are again examined for any defects that may not have been observed in the unbent sections.

In an effort to modify the characteristic penetration pattern obtained with the stringer bead teachnique an oscillating technique has been used. This technique involves applying to the arcing terminal of the electrode a harmonic oscillation to produce a wider bead with less average dilution than is obtained with the stringer bead technique. An objection to this method is the occurrence of papillary depressions of the fusion line at the bead edges which causes failure when samples of the clad metal are subjected to side bend tests. Failure of the side bend specimens have been attributed to the highly localized areas of low ductility material at the papillary depressions and to the localized stress concentrations arising from the "notch effect" created by these depressions. With a harmonic oscillation there is an inherent dwell of the electrode at the bead edges and the effect of this inherent dwell, present in all harmonic oscillators, is to increase the energy input to the weld in localized areas at the bead edges thereby causing the undesirable deep localized penetration in these areas.

It is an object of this invention to provide a fusion cladding arc welding procedure in which the arcing terminal of the electrode is oscillated in a manner to avoid the formation of papillary depressions of the fusion line in the weld metal at the bead edges of deposited cladding metal.

It is also an object of this invention to attain this result when welding in a shielding atmosphere under conditions producing an axial spray deposit of clad metal from the electrode to the base metal.

It is a further object of this invention to control the welding operation in a manner to obtain a uniform shallow weld penetration pattern between the clad metal and the base metal when making an overlay of a single bead or an overlay comprising a plurality of overlapping beads.

These and other objects and advantages of this invention will be pointed out and will become apparent from the following description thereof.

In accordance with this invention an overlay of clad metal is formed on a base metal by arc welding with a fusible electrode which is oscillated laterally of its travel along the base metal to form a wide bead deposit. A substantially uniform depth of weld penetration and a substantially uniform dilution of the clad metal by the base metal is obtained by imparting a linear constant velocity to the arcing terminal of the electrode along a straight line equilateral saw tooth pattern of travel parallel to the surface of the base metal. This saw tooth pattern of oscillation distributes the arc energy substantially uniformly across the entire width of the bead formed by the metal deposited from the electrode and avoids the formation of papillary depressions of the fusion line at the edges of the weld bead such as are formed when a harmonic or sinusoidal oscillation is imparted to the electrode. Under certain circumstances, as when forming a surface of overlapping beads, the arcing terminal of the electrode may be oscillated at constant velocity along a modification of this saw tooth pattern in which the points on the overlap side thereof have been truncated to produce periods of arc dwell of sufficient duration to secure complete fusion at the overlap between the edge of an additional bead of deposited weld metal and the edge of a previously deposited bead of weld metal. This procedure is not always necessary. During the welding operation the depth of weld penetration is decreased by concentrating the arc directly on the weld pool instead of on the base metal and the welding current is decreased by employing an extended electrode stickout from its current supply contact means, which also increases the melt off rate of the electrode.

The invention will be further described and explained in detail in connection with the accompanying drawing in which:

FIG. 1 shows diagrammatically a welding apparatus for performing cladding in accordance with the invention;

FIG. 2 is a side view of the work support of FIG. 1 and illustrates the overlay welding operation as being performed slightly "down hill" to allow the weld pool to flow ahead of the arc;

FIG. 3 diagrammatically shows the harmonic oscillation heretofore employed in fusion arc cladding operations;

FIG. 4 illustrates a sectional view of clad metal obtained when a harmonic oscillation is imparted to the arcing terminal of the electrode;

FIG. 5 diagrammatically illustrates the constant velocity oscillation employed in accordance with the present invention;

FIG. 6 shows a sectional view of metal clad in accordance with the invention, and FIG. 7 illustrates diagrammatically a modification of the saw tooth oscillation sometimes employed to secure dwell periods of sufficient duration to secure complete fusion between the edge of an additional bead of deposited weld metal and the edge of a previously deposited bead of weld metal.

One form of apparatus suitable for performing the invention is diagrammatically shown in FIG. 1. It comprises a welding head 1 mounted on a carriage 2 for straight line oscillatory travel along a support member 3. A constant velocity saw tooth pattern of travel is imparted to the welding head 1 and its support carriage 2 by a variable speed constant velocity cam 4 acting through a follower mechanism comprising a drive rod 5, one end of which is connected to carriage 2 and the other end of which provides a support for a cam follower roll 6. The cam follower roll is biased into engagement with the surface of cam 4 by a lever 7 which is pivoted at its lower end to support member 3 and biased toward the cam by a spring 8 located between its upper end and a fixed member 9 forming a part of the machine structure. The drive rod 5 is pivotally supported on lever 7 and on carriage 2 to permit movement thereof relative to these members as the cam follower roll 6 moves about the periphery of cam 4. A variable speed motor 10 has a shaft 11 on which the cam 4 is supported for rotation. By adjusting the speed of rotation of motor 10 the speed of oscillation imparted to welding head 1 may be adjusted. The configuration of the cam determines the pattern and the width of the oscillation produced thereby.

The welding head 1 is a tubular barrel providing passageways therethrough for the welding electrode, a shielding gas and a cooling medium such as water. The electrode 12 is a continuous length of wire which is withdrawn through a flexible casing 13 from a supply coil thereof on a reel 14 which is mounted on a stationary part 15 of the machine frame. The electrode is discharged from casing 13 to the feed rolls 16 of a feeding mechanism also supported on the machine frame. These feed rolls engage the electrode and are driven at an adjustable speed by an electric motor 17 connected thereto. The electrode is driven by the feed rolls 16 through a flexible wire casing 18 and through the welding head 1 into arcing engagement with the workpiece 19 which is to be provided with a bead 20 of clad metal. This workpiece is mounted on a carriage 21 which is propelled along an inclined track 22 and its support 23 by a chain drive 24. The inclination of the track has been exaggerated in the drawing since usually about five degrees of inclination is sufficient to allow the weld pool to flow ahead of the arc. Weld bead penetration is thus minimized by having the arc strike to the weld pool instead of the base metal. Such an arrangement is known as "down hill" welding. In addition to or as a substitute for "down hill" welding, the welding head may be inclined to the surface of the workpiece to direct the arc onto the fused metal as in backhand welding.

During the welding operation shielding gas is supplied through a hose 25 and a longitudinal passageway in the welding head 1 to the nozzle 26 thereof through which it is discharged as a flowing stream about the arcing terminal of the electrode and the arc between the electrode and the workpiece and over the molten weld metal produced by the arc. The welding head and its nozzle are cooled by a suitable flow of water supplied through a hose 27 to channels extending lengthwise of the welding head, one of which exhausts through a hose 28 to supply the cooling fluid to a passageway in nozzle 26 from which it is exhausted through a hose 29. One terminal of a suitable supply of welding current is connected through a conductor 30 to a contact within the welding head which engages the electrode as it is fed therethrough. The other terminal of the source of welding current supply is connected to the carriage 21 or to the workpiece 19 supported thereon. Any suitable source of welding power may be used, such as a direct current rectifier having a drooping volt-ampere characteristic and having its positive terminal connected to the electode (reverse polarity welding). With such a source of welding power the shielding gas is preferably an inert gas such as argon or argon containing a 1% oxygen addition.

FIG. 4 is a sectional view illustrating a clad surface of stainless steel formed by overlapping beads 31 deposited on a base metal 32 of carbon or alloy steel by imparting to the arcing terminal of the electrode a harmonic or sinusoidal motion such as is diagrammatically illustrated at 33 in FIG. 3. The interface between the overlay deposit and the base metal is represented by the solid line 34 and is characterized by deep papillary depressions 35 obtained at the edges of each bead. In FIG. 4 the heat affected zone has been indicated between the dotted line 36 and solid line 34. The deep depressions 35 obtained at the edges of each bead are areas of highly localized dilution consisting of hardened low ductility martensite with or without bainite or other undesirable metallurgical constituents resulting from excessive dilution. When sections of an overlay such as shown in FIG. 4 are subjected to side bend tests failure usually occurs in the immediate area of these papillary depressions. Failure of these side bend specimens is attributable to highly localized areas of low ductility material and also to the localized stress concentrations arising from the "notch effect" created by these deep depressions.

The effect of the inherent dwell periods in all harmonic or sinusoidal oscillators is to increase the energy input to the weld in the localized areas of the bead edges thereby causing the undesired deep localized penetrations in these areas as will become apparent from a consideration of the motion wave shown in FIG. 3 where the pattern of oscillation shown at the left of the figure has been expanded to indicate the nature of the motion wave. Examination of this harmonic or sinusoidal motion pattern 33 shows that in each case there is an inherent dwell of the electrode at the bead edges. This is indicated on the curve as a slope gradually approaching zero, reaching zero at the instant of direction reversal, and then gradually increasing to a maximum value in the reverse direction when it crosses the center line of oscillation.

By oscillating the arcing terminal of the electrode at constant velocity over the base metal along a straight line equilateral saw tooth wave pattern 37 as shown in FIG. 5 an overlay deposit of overlapping beads 38 as shown in FIG. 6 may be obtained on the base metal 39 without the production of deep papillary depressions at the edges of each bead. As shown in FIG. 6, it will be noted that the interface 40 between the clad metal 38 and the base metal 39 is devoid of these papillary depressions. In FIG. 6 the heat affected area of the base metal 39 has been indicated between the solid line 40 and the dotted line 41. An examination of the linear constant velocity oscillation employed in accordance with this invention shows that the electrode does not decrease its velocity as it nears the end point of an oscillation, but moves to the point of reversal at constant velocity and reverses its direction instantly and travels away from the point of reversal at the same constant velocity. The effect of this constant velocity oscillating motion is to distribute the arc energy uniformly over the entire bead width thereby avoiding deep localized zones of penetration at the bead edges.

A modification of the saw tooth oscillation pattern can be made by intentionally causing a controlled dwell to occur on one edge of the weld bead to increase the energy input along that edge. The pattern of oscillation in accordance with this modification is shown in FIG. 7 at 42 where the points on the overlap side of the saw tooth path of travel of FIG. 5 have been truncated to produce periods of arc dwell which are of sufficient duration to secure complete fusion at the overlap between the edge of an additional bead of deposited weld metal and the edge of a previously deposited bead of weld metal.

Weld penetration may be decreased by decreasing the welding current and increasing the electrode stickout from the contact means in the welding head. The decrease in current decreases weld penetration and the resistance heating occurring in the electrode stickout increases the melt off rate in the electrode. It has also been found that by increasing the oscillation speed, the depth of penetration can be minimized. The combination of extended electrode stickout beyond its current contact, lower welding current and high speed oscillation used in conjunction with the technique of playing the arc on the weld pool rather than on the base metal produces overlays of excellent contour and minimum penetration. The unmodified constant velocity pattern of oscillation shown in FIG. 5 when used with reverse polarity inert gas shielded arc welding with axial spray deposit produces complete fusion at the bead overlap when a plurality of overlapping beads are employed to produce a clad surface. The electrode sizes found to be most desirable have diameters of $\frac{1}{16}$ and $\frac{3}{32}$ inch. It was found that larger diameter electrodes produce excessive penetration and smaller diameter electrodes are too flexible to be used with an extended electrode stickout in conventional welding heads. This latter limitation is not imposed, however, when the welding head embodies an electrode guide for supporting the electrode stickout from its contact means as is disclosed in application S.N. 782,474 of Ralph D. Engel, filed November 23, 1958, entitled "Welding Torch" and on which Patent 2,951,934 was issued on September 6, 1960. Also as shown in this application dual welding heads operating in parallel may be used to increase the width of a weld bead deposit and the rate at which weld metal is deposited. In this dual arc technique the electrodes are positioned one oscillation width apart.

Bead contour is controlled by oscillation width and work travel speed. Typical conditions are shown at the left hand portions of FIGS. 5 and 7 showing the pattern of travel of the arcing terminal of the electrode over the workpiece. If, for instance, a high build up is desired the oscillation width and travel speed should be reduced. In some cases variation of the bead width is not possible and then travel speed alone must be varied to obtain the desired build up. The ideal bead contour is one with gently sloping edges and a flat uniform bead surface as shown in FIG. 6. As previously stated depth of penetration is controlled by welding current and oscillating speed to which may be added arc length, base metal temperature and electrode extension. To obtain minimum penetration the welding current is held at a minimum value for spray transfer and a long electrode stickout of 1 to 3 or more inches beyond its current contact is used to increase the deposition rate. The arc length is adjusted to produce a slightly crackling sound only at the bead overlap. The oscillation speed has a marked affect on depth of penetration. An overlay made with relatively high oscillation speeds shows less depth of penetration than those made with somewhat slower oscillation speeds. Also a wide bead deposit produces less dilution of the clad metal than is obtained with a narrow bead. Oscillation speeds of from 65 to 80 cycles per minute have been used. Excessive oscillation speeds may result in random lack of fusion, arc disturbance and uneven wetting at the bead edges. The lower limit of oscillation speed is determined principally by the work travel speed. The oscillation speed must be high enough to maintain a continuous molten weld pool along the entire bead width at any particular workpiece travel speed. The oscillation speed for any particular operation is seldomly varied after the optimum oscillation speed has once been determined. The optimum range of oscillation width has been found to be approximately 1 to 3 inches, but considerable latitude is allowable depending upon the requirements of the particular application.

Backhand welding, where the arc is directed back on the fused metal, is employed to minimize penetration and obtain the desired build up. The same result is accomplished when the welding operation is performed slightly "down hill" to allow the weld pool to flow ahead of the arc as pointed out in connection with the description of the welding apparatus of FIGS. 1 and 2. This "down hill" technique may be used to greatest advantage when cladding cylindrical forms. In cases where cladding must be performed with the work travelling horizontally, the backhand welding technique is usually sufficient to produce satisfactory overlays, but the "down hill" technique is always preferred.

Multiple layers of overlay material may be employed to increase the thickness of the overlay. The first or bottom layer is made using lower currents and relatively high oscillation speeds to ensure minimum penetration and minimum dilution. Additional upper layers may then be made at higher currents with the oscillation speed somewhat reduced to ensure complete fusion at the bead interface. Base metal preheat and interpass temperature do not seem to be critical but a preheat and interpass temperature of approximately 200–300° F. is recommended for optimum results. Overheating of the workpiece should be avoided in order to keep clad metal dilution and bead surface oxidation to a minimum. Interpass cleaning of the bead surface is not believed to be necessary. However, if cleaning is desired wire brushing is sufficient.

The following are examples of procedures in accordance with the invention:

EXAMPLE 1

*Stainless steel on mild steel*

| | |
|---|---|
| Electrode wire | 1/16" dia. stainless steel. |
| Base metal | Mild steel. |
| Preheat | 300° F. |
| Interpass temp | 250–300° F. |
| Power source | Direct current reverse polarity. |
| Gas shield | Argon+1% oxygen. |
| Oscillation width | 1½". |
| Gas flow | 40 c.f.h. |
| Interpass cleaning | Wire brush (not essential). |

| Layer | Current, amps. | Voltage, volts | Wire Feed, i.p.m. | Osc. Speed, cyl./min. | Welding Speed, i.p.m. | Arc Length, in. | Electrode Extension | Melt-off rate, lbs./hr. |
|---|---|---|---|---|---|---|---|---|
| 1st | 240 | 29 | 210 | 80 | 4 | 5/16 | 1⅜ | 11.0 |
| 2nd | 290 | 30 | 240 | 65 | 5¾ | ¼ | 1⅛ | 12.5 |
| 3rd | 290 | 30 | 240 | 65 | 5¾ | ¼ | 1⅛ | 12.5 |

EXAMPLE 2

*Stainless steel on mild steel*

| | |
|---|---|
| Electrode wire | 3/32" dia. stainless steel. |
| Base material | Mild steel. |
| Preheat | 300° F. |
| Interpass temp | 300° F. |
| Power source | Direct current reverse polarity. |
| Gas shield | Argon+1% oxygen. |
| Oscillation speed | 92 cyl./min. |
| Gas flow | 60 c.f.h. |
| Oscillation width | 1½". |
| Electrode extension | 3". |
| Welding speed | 5½" i.p.m. |

| Layer | Current, amps. | Voltage, volts | Wire Feed Speed, i.p.m. | Melt-Off Rate, lbs./hr. |
|---|---|---|---|---|
| 1st | 350 | 36.0 | 176 | 21 |
| 2nd | 350 | 36.0 | 176 | 21 |

EXAMPLE 3

*Aluminum bronze on mild steel*

| | |
|---|---|
| Electrode wire | 5/64" dia. aluminum bronze stranded wire. |
| Base material | Mild steel. |
| Preheat | 290° F. |
| Interpass temp | 300° F. |
| Power source | Direct current reverse polarity (constant voltage). |
| Gas shield | Argon. |
| Oscillation speed | 70 cyl./min. |
| Oscillation width | 1 4/16". |
| Gas flow | 50 c.f.h. |
| Electrode extension | 1". |
| Welding speed | 4½ i.p.m. |
| Interpass cleaning | None. |
| Welding technique | Work horizontal, welding barrel 23° forehand. |

| Layer | Current, amps. | Voltage, volts | Wire Feed, i.p.m. | Arc Length, in. | Melt-Off Rate, lbs./hr. |
|---|---|---|---|---|---|
| 1st | 235 | 26 | 164 | ¼ | 13 |
| 2nd | 275 | 25 | 184 | ¼ | 15.5 |

It is of course apparent that various forms of apparatus other than that above described may be used in practicing the invention. It is also apparent that the welding operation, aside from the oscillation pattern, may be variously modified in view of the above discussion of control factors to obtain a uniform shallow penetration pattern. It is, therefore, obvious to those skilled in the art that the invention may be variously modified without departure from its spirit and scope as defined in the following claims.

What is claimed is:

1. In the formation of an overlay of a clad metal on a base metal by arc welding with a fusible electrode which is oscillated laterally of its travel along the base metal to form a wide bead deposit, the method of obtaining a substantially uniform depth of weld penetration and a substantially uniform dilution of the clad metal by the base metal which comprises imparting a linear constant velocity straight line oscillation to the arcing terminal of the electrode transversely to its direction of travel along the surface of the base metal.

2. In the formation of an overlay of a clad metal on a base metal by arc welding with a fusible electrode which is oscillated laterally of its travel along the base metal to form a wide bead deposit, the method of obtaining a substantially uniform depth of weld penetration and a substantially uniform dilution of the clad metal by the base metal which comprises imparting a linear constant velocity to the arcing terminal of the electrode along a straight line equilateral saw tooth pattern of travel parallel to the surface of the base metal to distribute the arc energy substantially uniformly across the entire bead width.

3. The method of applying a wide bead of clad metal on a base metal by arc welding which comprises imparting a linear constant velocity to the arcing terminal of an electrode of clad metal along a straight line equilateral saw tooth pattern of travel parallel to the surface of the base metal to reverse instantly its travel to and from the edges of the weld bead deposit where an end dwell characteristic of the oscillation would result in the formation of papillary depressions of fusion in the base metal and the concentration of stresses in the low ductility material formed in these depressions by a localized dilution of the clad metal by the base metal.

4. In the formation of a surface of clad metal on a base metal by arc welding deposits of overlapping flat beads of the clad metal on the base metal, the method of applying the first bead deposit by imparting a linear constant velocity to the arcing terminal of the electrode along a straight line equilateral saw tooth pattern of travel parallel to the surface of the base metal to obtain a substantially uniform depth of weld penetration and a substantially uniform dilution of the clad metal by the base metal, and thereafter applying additional flat beads of weld metal having an edge overlapping the edge of a previously deposited bead of weld metal by imparting to the arcing terminal of the electrode a linear constant velocity path of travel parallel to the surface of the base metal and along a modification of said saw tooth pattern in which the points on the overlap side of the path of travel have been truncated to produce periods of arc dwell of sufficient duration to secure complete fusion at the overlap between the edge of said additional bead of deposited weld metal and the edge of a previously deposited bead of weld metal.

5. In the formation of an overlay deposit of a clad metal on a base metal by an arc welding deposit from a fusible electrode which is oscillated laterally of its travel along the base metal to form a wide bead, the method of obtaining a substantially uniform depth of weld penetration and a substantially uniform dilution of the clad metal by the base metal which comprises imparting a linear constant velocity to the arcing terminal of the electrode along a straight line equilateral saw tooth pattern of travel parallel to the surface of the base metal at a speed sufficient to maintain a flat continuous pool of molten metal across the entire width of the weld bead, and decreasing the depth of weld penetration and increasing the melt off rate of the electrode by concentrating the arc directly on the weld pool instead of on the base metal and by decreasing the welding current by employing an extended electrode stickout from its current supply contact means.

6. In the formation of an overlay deposit of a clad metal on a base metal by a gas shielded axial spray deposit of weld metal from a fusible electrode which is oscillated laterally of its travel along the base metal to form a wide bead, the method of obtaining a substantially uniform depth of weld penetration and a substantially uniform dilution of the clad metal by the base metal which comprises imparting a linear constant velocity to the arcing terminal of the electrode along a straight line equilateral saw tooth pattern of travel parallel to the surface of the base metal at a speed sufficient to maintain a flat continuous pool of molten metal across the entire width of the weld bead, and decreasing the depth of weld penetration and increasing the melt off rate of the electrode by concentrating the arc directly on the weld pool instead of on the base metal and by decreasing the welding current required to obtain an axial spray deposit of electrode metal by increasing the electrode stickout from its current supply contact means.

7. In the formation of a surface of clad metal on a base metal by arc welding deposits of overlapping flat beads of the clad metal on the base metal, the method of applying the first bead deposit by imparting a linear constant velocity to the arcing terminal of the electrode along a straight line equilateral saw tooth pattern of travel parallel to the surface of the base metal to obtain a substantially uniform depth of weld penetration and a substantially uniform dilution of the clad metal by the base metal, applying additional flat beads of weld metal having an edge overlapping the edge of a previously deposited bead of weld metal by imparting to the arcing terminal of the electrode a linear constant velocity path of travel parallel to the surface of the base metal and along a modification of said saw tooth pattern in which the points on the overlap side of the path of travel have been truncated to produce periods of arc dwell of sufficient duration to secure complete fusion at the overlap between the edge of said additional bead of deposited weld metal and the edge of a previously deposited bead of weld metal, and during the formation of said overlapping flat bead deposits decreasing the depth of weld penetration and increasing the melt off rate of the electrode by concentrating the arc directly on the weld pool instead of the base metal and by decreasing the welding current by employing an extended electrode stickout from its current supply contact means.

8. In the formation of a surface of clad metal on a base metal by gas shielded axial spray deposits of weld metal to form overlapping flat beads of the clad metal on the base metal, the method of applying the first bead deposit by imparting a linear constant velocity to the arcing terminal of the electrode along a straight line equilateral saw tooth pattern of travel parallel to the surface of the base metal to obtain a substantially uniform depth of weld penetration and a substantially uniform dilution of the clad metal by the base metal, applying additional flat beads of weld metal having an edge overlapping the edge of a previously deposited bead of weld metal by imparting to the arcing terminal of the electrode a linear constant velocity path of travel parallel ot the surface of the base metal and along a modification of said saw tooth pattern in which the points on the overlap side of the path of travel have been truncated to produce periods of arc dwell of sufficient duration to secure complete fusion at the overlap between the edge of said additional bead of deposited weld metal and the edge of a previously deposited bead of weld metal, and during the formation of said overlapping flat bead deposits decreasing the depth of weld penetration and increasing the melt off rate of the electrode by concentrating the arc directly on the weld pool instead of the base metal and by decreasing the welding current required to obtain an axial spray deposit of electrode metal by increasing the electrode stickout from its current supply contact means.

References Cited in the file of this patent

UNITED STATES PATENTS

| | | |
|---|---|---|
| 1,667,585 | Chapman | Apr. 24, 1928 |
| 1,933,340 | Raymond | Oct. 31, 1933 |
| 2,525,133 | Hopkins | Oct. 10, 1950 |
| 2,669,640 | Outcalt et al. | Feb. 16, 1954 |
| 2,776,363 | Payne | Jan. 1, 1957 |
| 2,813,190 | Felmley | Nov. 12, 1957 |

FOREIGN PATENTS

| | | |
|---|---|---|
| 924,707 | Germany | Mar. 7, 1955 |